June 14, 1955     P. C. SHERERTZ     2,710,913
TRIGGER CIRCUIT WITH LOW IMPEDANCE OUTPUT
Filed July 10, 1951     3 Sheets-Sheet 2
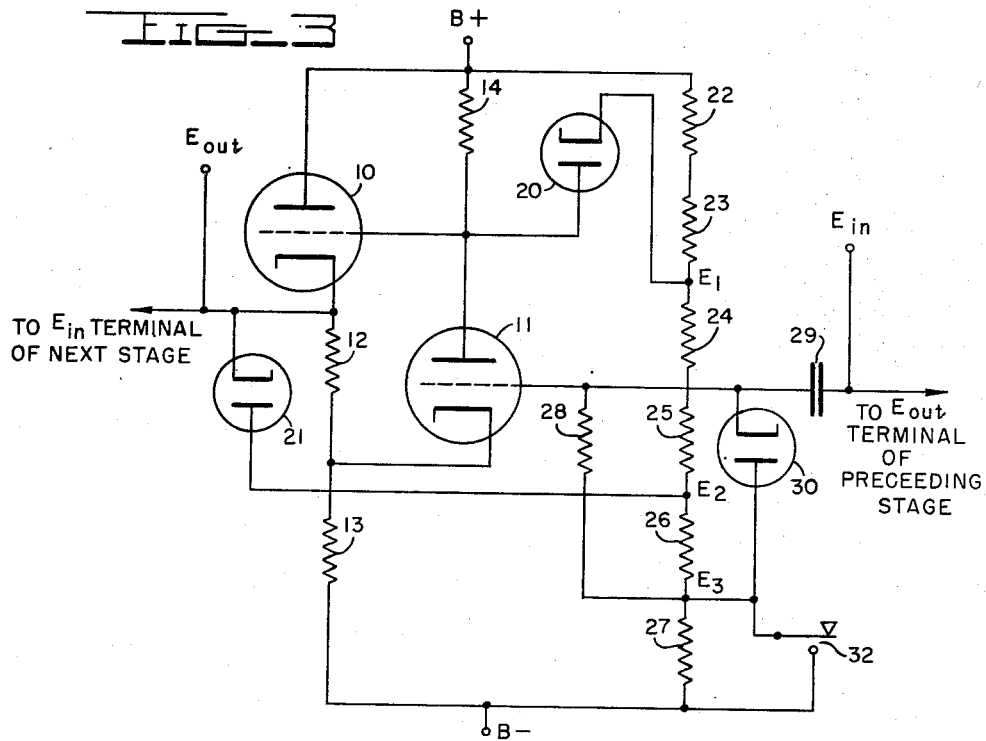
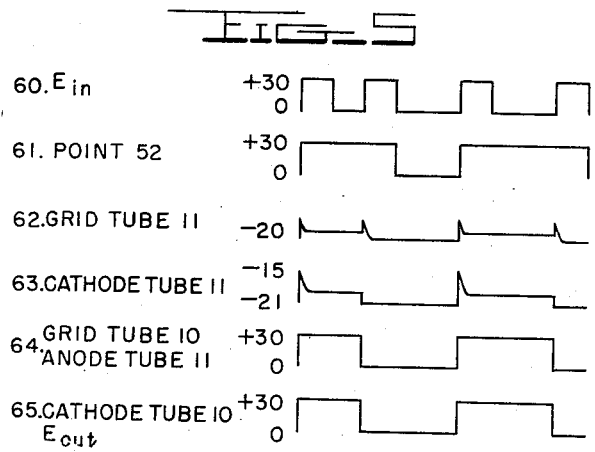
INVENTOR
PAUL C. SHERERTZ
BY
ATTORNEYS

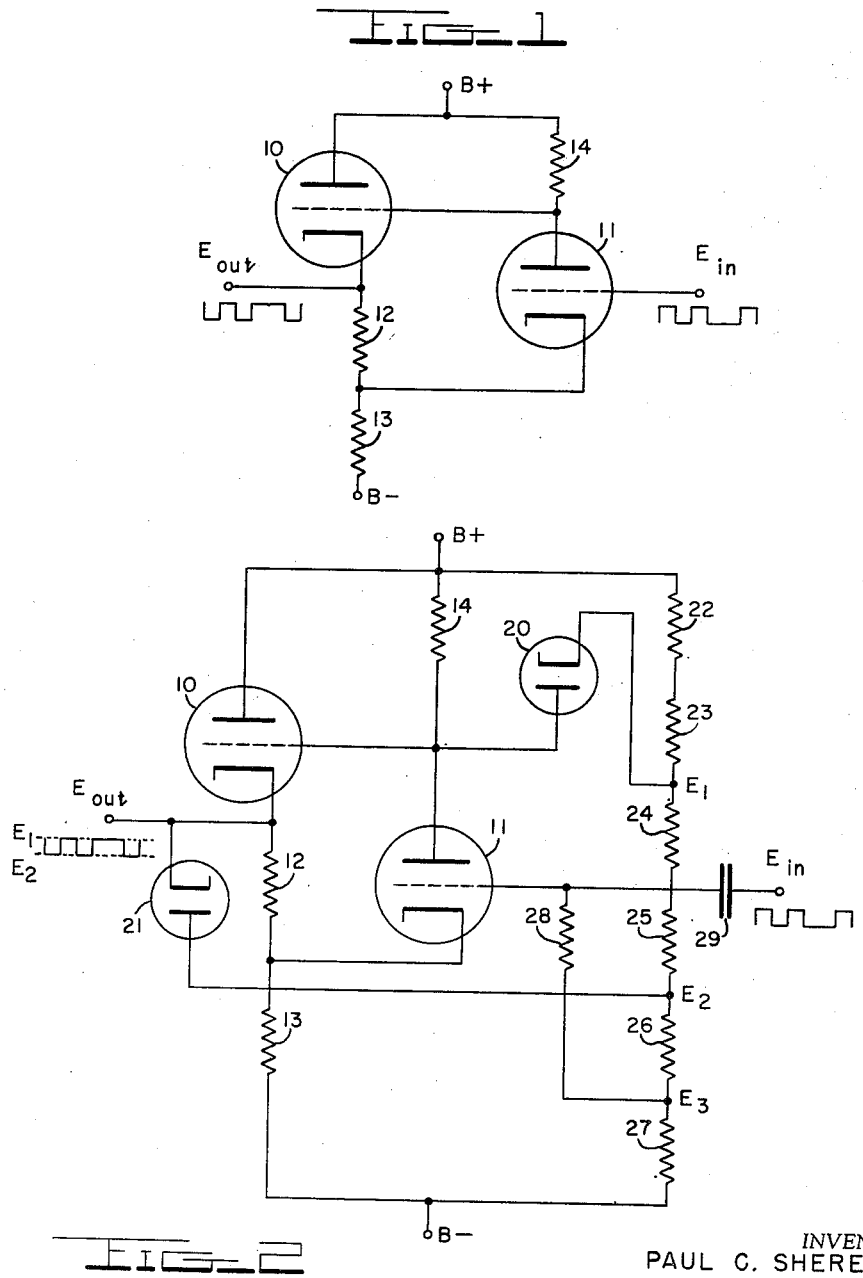

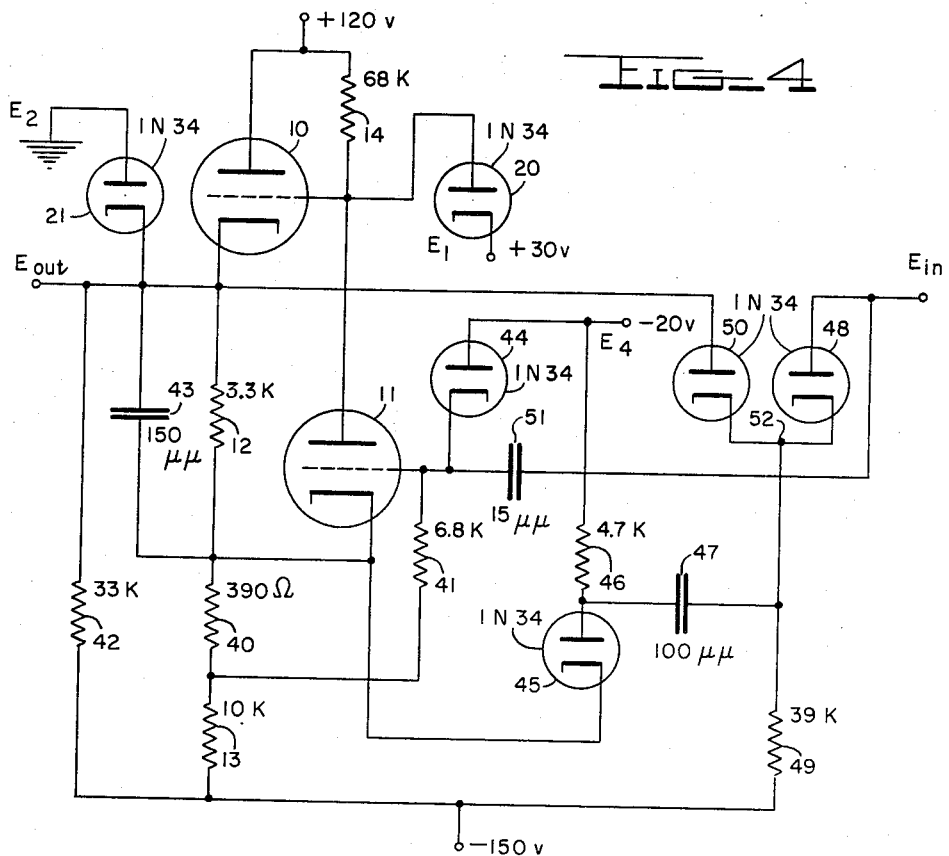

United States Patent Office 2,710,913
Patented June 14, 1955

2,710,913

TRIGGER CIRCUIT WITH LOW IMPEDANCE OUTPUT

Paul C. Sherertz, Washington, D. C., assignor to the United States of America as represented by the Secretary of the Navy Application July 10, 1951, Serial No. 236,049

10 Claims. (Cl. 250—27)

(Granted under Title 35, U. S. Code (1952), sec. 266)

This invention relates generally to electronic trigger circuits, and more particularly to a regenerative trigger circuit having two stable states and a low impedance output.

There are many recognized uses for trigger circuits in the electronic art. Undoubtedly the most prolific example is found in electronic computers. Electronic computers usually employ a small number of different types of trigger circuits and use hundreds of each type. Therefore any shortcomings or advantages in a particular trigger circuit become unusually significant when the circuit is used in a computer.

Except for the vacuum tubes, the components of conventional trigger circuits are considered to have indefinite life. Consequently tube failure is the major source of breakdown. In large scale applications of trigger circuits it becomes necessary to limit the circuit functions to operations requiring a minimum number of tubes, not only to minimize breakdown but also to minimize maintenance cost for tube replacements.

It has been found particularly desirable in electronic computers and other applications to use trigger circuits having a low impedance output and direct coupling. However, prior art counter and flip-flop circuits have neither of these features. Therefore a low impedance output can be obtained only by addition of a cathode follower stage to each circuit, thus requiring additional vacuum tube elements and the disadvantages incident thereto.

The present invention provides a trigger circuit which inherently has low impedance output without the addition of cathode followers. Furthermore, this trigger circuit may be arranged to perform all types of trigger circuit functions such as flip-flops, gates, and counters, without the addition of vacuum tube elements, all of said circuit arrangements being largely direct coupled.

It is an object of this invention to provide an improved trigger circuit.

It is another object of this invention to provide a trigger circuit having low impedance output.

It is another object of this invention to provide a direct coupled trigger circuit having low impedance output.

It is another object of this invention to provide a trigger circuit with fixed output potentials.

It is another object of this invention to provide a trigger circuit principle adaptable to all types of trigger circuit functions.

Other objects and advantages will be apparent from the following description and accompanying drawings in which similar characters of reference indicate similar parts throughout the several embodiments.

Fig. 1 is a schematic diagram illustrating the fundamental principle of the invention.

Fig. 2 is a schematic diagram of the embodiment of Fig. 1 modified to provide a flip-flop output operating between fixed potential levels.

Fig. 3 is a schematic diagram of the embodiment of Fig. 2 modified to provide resetting means.

Fig. 4 is a schematic diagram of the embodiment of Fig. 2 modified to operate as a scale of two counter.

Fig. 5 is a series of waveforms illustrating potential levels at various points throughout the circuit of Fig. 4.

Briefly, this invention provides a direct coupled trigger circuit having low impedance output requiring only a dual-triode tube or its equivalent and a minimum of circuit components. To accomplish this invention the first triode section is provided with a cathode load across which the low impedance output is taken. The second section is provided with a plate load. Regeneration is provided by directly coupling the grid of the first section to the plate of the second and the cathode of the second to an intermediate point in the cathode load of the first.

Referring now to Fig. 1 in detail, a pair of triode type electron tubes 10 and 11 are shown. Generally, though not necessarily, each tube will be half of a dual-triode. The plate of tube 10 is directly connected to a positive voltage source B+, the cathode of tube 10 is connected to a negative voltage source B— through a pair of serially connected resistors 12 and 13. Resistor 12 is at the cathode end of the series connection and is smaller in value than resistor 13. The plate of tube 11 is connected to B+ through a resistor 14 having a magnitude several times that of resistor 13. The cathode of tube 11 is directly connected to the junction of resistors 12 and 13. The grid of tube 10 is directly connected to the plate of tube 11. The output is taken at the cathode of tube 10 thus providing a low impedance output. The input may be at the grid of tube 11 as shown in Fig. 1 or may be applied at any electrode of either tube if a suitable grid return is supplied for the grid of tube 11. Oscillograms are shown in Fig. 1 illustrating the voltage at the cathode of tube 10 for a particular input voltage at the grid of tube 11.

Considering now the operation of this invention, as shown in Fig. 1 a flip-flop circuit is provided having two stable states which ostensibly find one tube conducting and the other cut off and vice versa. Actually, neither tube need reach cut off in its "non-conducting" state provided there is a reduction in plate-cathode current. Considering for example the oscillogram shown in Fig. 1, when the grid of tube 11 is raised there will be an increase in current in tube 11 and a resultant voltage drop at its plate due to load resistor 14. The voltage drop at the plate of tube 11, is also present at the grid of tube 10 causing a reduction of current in tube 10. The reduced current in tube 10 reduces the voltage drop across resistors 12 and 13 thus lowering the potential of the cathode of tube 11 connected to their midpoint. Because of the relative size of resistors 13 and 14, the increased current flow in tube 11 has less effect than the decreased current flow in tube 10 on the resultant voltage drop across resistor 13. The regenerative action is thus set up, the decreased current in tube 10 lowers the cathode potential of tube 11 which increases the current in tube 11 which lowers the grid potential of tube 10 and again lowers the current in tube 10, and so on.

A reversed regenerative action takes place in response to a decreasing signal voltage applied at the grid of tube 11: the lowered grid potential decreases the current in tube 11 which raises the potential of its anode and the grid of tube 10 which increases the current in tube 10 which raises the potential at both cathodes which again decreases the current in tube 11 and so on. Therefore the circuit of Fig. 1 flips from one state to the other in response to each polarity change of the input trigger signal. Since no grid return for tube 11 is used in Fig. 1 it will be understood that the minimum potential of $E_{in}$ must have a D. C. level low enough to permit effective current cut-off in tube 11.

In Fig. 2, the circuit of Fig. 1 has been modified to operate, or flip, between two fixed potential levels $E_1$ and $E_2$ as indicated by oscillograms. In addition an exemplary grid return arrangement for tube 11 is shown which renders the circuit responsive to variations in $E_{in}$ without restrictions on the D. C. level of $E_{in}$. This is accomplished by connecting the grid of tube 11 to a third fixed potential level $E_3$ through a resistor 28. $E_{in}$ is then coupled to the grid of tube 11 through a condenser 29. The mode of operation of Fig. 2 is dependent upon the level selected for $E_3$. If $E_3$ is selected to be between the minimum and maximum excursions normally experienced by the cathode of tube 11, the circuit will operate as a flip-flop having two stable states. However if $E_3$ is either above the maximum or below the minimum the circuit will operate as a one-shot multivibrator with its unstable state controlled by the values of resistor 28 and condenser 29. For example, if a change in voltage at $E_{in}$ is of suitable polarity to flip the circuit to its unstable state, after the change in voltage has discharged from condenser 29 through 28, the grid of tube 11 will then return to a voltage level either above or below that of its cathode causing the circuit to flip to its stable state. To obtain an output operating between fixed potential levels, the circuit of Fig. 1 is modified in the Fig. 2 embodiment by adding a diode 20 having its plate connected to the plate of tube 11 and its cathode connected to the higher of the two fixed potential levels $E_1$, and a diode 21 having its cathode connected to the cathode of tube 10 and its plate connected to the lower fixed potential level $E_2$. Potentials $E_1$, $E_2$, and $E_3$ may be derived from independent potential sources or from a voltage divider between B+ and B— as shown by the serial connection of resistors 22—27 between B+ and B— in Fig. 2. In any event potentials $E_1$ and $E_2$ should have values between B+ and B— and $E_3$ should be more negative than $E_2$. In applications where a large number of circuits are operating between the same potential levels it is preferred to use a separate supply for each of $E_1$, $E_2$, and $E_3$, thus avoiding the relatively heavy bleeder current required for the voltage divider and possible undesired coupling or interaction through the power supply.

The effect of diodes 20 and 21 is to respectively couple the grid and cathode of tube 10 to $E_1$ and $E_2$ as maximum and minimum voltage levels. When conduction is predominate in tube 11 its plate may drop below level $E_1$ to minimize conduction in tube 10, however the cathode of tube 10 is clamped to $E_2$ as a minimum potential level by diode 21. When conduction is predominate in tube 10 the plate of tube 11 will rise but it cannot rise above $E_1$ due to the clamping action of diode 20, this fixes the grid potential of tube 10 at $E_1$. The cathode of tube 10 is not restricted from rising above $E_2$ by diode 21 and will attain substantially the potential $E_1$ on its grid due to cathode follower action. Actually the maximum voltage at the cathode of tube 10 will differ from $E_1$ by the small grid-cathode voltage of tube 10.

In Fig. 3 the circuit of Fig. 2 has been modified to provide a reset means. Two independent applications of this invention are afforded by connecting the reset means in parallel to a plurality of trigger stages. If each stage is to be used for example as a gating circuit with independent output and input terminals, actuation of the reset means will place all stages in the same state regardless of their previous state. If the plurality of stages are connected in cascade, as indicated in Fig. 3, and all but one of the stages are in the reset state, a ring type counter action is provided in which each actuation of the reset means returns the one stage to its reset state and flips the next succeeding stage to its other state.

Referring now to Fig. 3 in detail, this embodiment differs from Fig. 2 by the addition of a diode 30 and a key 32. Key 32 is connected between $E_3$ and B—. $E_3$ should be selected as described in connection with Fig. 2 to avoid operation as a one-shot multivibrator. Momentarily lowering $E_3$ as by momentarily closing key 32 applies a sudden negative potential to the grid of tube 11 which operates as the reset pulse. Since it would be undesirable to lower $E_3$ in a manner which would also affect $E_1$ and $E_2$, in practice independent power sources are used for these voltages. For automatic operation a negative pulse may be substituted for key 32. Diode 30 is connected between the grid of tube 11 and $E_3$ with its cathode terminal at the grid. Diode 30 functions to prevent the grid of tube 11 from dropping below $E_3$ in the absence of the reset pulse. This function is utilized in the ring counter arrangement to render tube 11 responsive only to the rising edge of signals coupled through condenser 29.

In the operation of Fig. 3 as a gating circuit, momentarily closing key 32 applies a sudden negative voltage to the grid of tube 11, which if tube 11 is in conduction, initiates the regenerative action of the circuit and transfers the conductive state to tube 10. Accordingly the cathode of tube 10 rises to $E_1$ and the cathode of tube 11 is raised to a potential more positive than $E_3$, reopening key 32 returns the grid of tube 11 to $E_3$ but because the cathode of tube 11 is now more positive than $E_3$ the circuit does not flip. If tube 10 is in the conductive state when key 32 is closed, the sudden negative voltage applied to the grid of tube 11 will have no effect and the circuit will not change its state. This operation will be identical in each of a group of independent gating circuits to which key 32 is connected in parallel. This function is used for example in zeroing a plurality of storage, control, or other circuits in an electronic computer after they have performed a particular operation.

In the operation of Fig. 3 as a ring counter circuit, it is assumed that a group of stages like that shown in Fig. 3 are connected in cascade as indicated at the $E_{in}$ and $E_{out}$ terminals of Fig. 3, it being further assumed that all stages are returned to common $E_1$, $E_2$, and $E_3$ terminals with a single key 32 connected to $E_3$ so that key 32 is effectively in parallel with all stages. Having reset all stages to the state where tube 11 is non-conducting and tube 10 is conducting, the potential of each $E_{out}$ terminal is $E_1$. If a positive pulse is applied through condenser 29 to the grid of tube 11 in one stage, this stage will regenerate and the potential at its $E_{out}$ terminal will drop to $E_2$. The next succeeding stage will be unaffected by this drop because its tube 11 was already non-conducting. Now if $E_3$ is momentarily lowered as by the application of a negative reset pulse or momentary closing of key 32, the negative voltage applied to tube 11 of each stage is ineffective except on the stage which has just regenerated to the state where tube 11 conducts. This stage will again regenerate and its $E_{out}$ terminal will rise to $E_1$. This rise in voltage is coupled to the grid of tube 11 of the next succeeding stage causing the tube to conduct and the stage to regenerate. However, since the reset pulse is applied to each tube 11 and is of sufficient duration to insure resetting, the input circuit to tube 11 must have a time constant long enough to apply the positive voltage from the resetting stage until after the reset pulse has terminated. More specifically, condenser 29 must not become discharged through resistor 28 until the negative resetting voltage has subsided. In this manner each succeeding reset pulse or momentary closing of key 32 will cause the regenerative trigger action to advance one stage along the ring.

Another computer circuit for which this invention is particularly well adapted is shown in Fig. 4. Here the embodiment of Fig. 2 is modified to operate as a scale of two counter. In this embodiment both grid and cathode of tube 11 are returned to intermediate points in the cathode load of tube 10. These points are separated by a resistor 40 which is smaller than resistor 12. The grid of tube 11 is returned through a resistor 41 to a lower potential point than its cathode, the negative end of resistor 40, to supply a small negative bias to tube 11. The cathode of tube 10 may be returned to B— through a resistor 42 to provide additional loading for the output terminal. Also the cathode of tube 10 may be coupled to the cathode of tube 11 through a condenser 43 to accelerate the regenerative action of the circuit.

The grid of tube 11 is clamped to a minimum fixed potential $E_4$, which is more negative than $E_2$, through diode 44. The cathode of tube 11 is connected to $E_4$ through diode 45 and resistor 46. Because of the intervention of the resistor the cathode is not rigidly clamped at $E_4$ but may drop below when there is a voltage drop in resistor 46, the junction of the plate of diode 45 and resistor 46 is connected to the signal input terminal through a condenser 47 and a diode 48, the junction of said condenser and diode being at the cathode end of the diode. The cathode of diode 48 is connected to B— through a resistor 49 and to the cathode of a diode 50 whose plate is connected to the cathode of tube 10. The signal input terminal is also connected to the grid of tube 111 through a condenser 51. Condenser 51 is chosen several times smaller than condenser 47 so that when equal signals are applied through each to tube 11, the signal coupled by condenser 47 will predominate. In selecting circuit values a specific relation must be maintained between certain elements; viz, resistors:

$$14 \gg (13+12+40);$$

condensers: $47 > 51$. All values are selected according to tube characteristics and operating voltages. Specific values are shown in Fig. 4, these values were chosen for the voltage shown and for tube 10 as half of a type 5687 and tube 11 as half of a 2C51. Type IN34 crystals are used for all the diodes, since they presumably have indefinite life. The values shown were also specifically selected for operation with input and output pulses varying between fixed potential levels of +30 volts and zero volts. It will be apparent that the principles of this invention may be readily adapted for pulses of different magnitude or polarity and different tube types and operating voltages.

Operation of the circuit of Fig. 4 may be better understood when considered in conjunction with the waveforms of Fig. 5. The input voltage $E_{in}$ shown at 60 in Fig. 4 portrays a group of unevenly spaced pulses to show that the circuit may respond to pulses of random width and spacing as well as periodic pulses. By comparing the output voltage $E_{out}$ shown at 65 in Fig. 5 with the input 60, the scale of two counter action of the circuit may be observed. It will be further observed that the circuit of Fig. 4 responds only to rising leading edges of the input signal.

Presuming an initial condition in which tube 11 is conducting, the arrival of the first signal pulse raises the common cathode connection 52 of diodes 48 and 50 to 30 volts. This voltage rise is carried to the cathode of tube 11 as shown in waveform 63 through condenser 27 and diode 45. The voltage rise is also applied to the grid of tube 11 through condenser 51 as shown at 62. Since the signal reaches the grid with less effect than the cathode and since tube 11 is already in conduction and drawing grid current, the signal at the cathode is controlling and triggers the regenerative action of the circuit. Thus, as explained in connection with Fig. 2 the plate of tube 11 is clamped at 30 volts (waveform 64) and the cathode of tube 10 (waveform 65) is also substantially 30 volts. When the first signal pulse drops to zero, point 52 is clamped at +30 volts by its connection through diode 50 to the cathode of tube 10 so this change of polarity cannot be communicated to the cathode of tube 11. Since the grid of tube 11 is clamped at —20 volts, it cannot be made more negative and no change of state occurs in the circuit.

Upon the arrival of the second signal pulse, point 52 is still clamped at +30 volts and is not raised by the 30 volt signal pulse and no voltage change is applied to the cathode of tube 11. However clamper diode 44 at the grid of tube 11 is ineffective toward positive voltage changes and the grid of tube 11 is raised, initiating the regenerative action of the circuit. The end of the second pulse finds the plate of diode 50 at ground potential, hence point 52 is permitted to drop to ground with the signal voltage. However point 52 is connected to the cathode of tube 11 through a unilateral path, and diode 45 prohibits the voltage decline from reaching the cathode. The grid of tube 11 is held ineffective as before by the clamping action of diode 44.

The arrival of the third pulse again raises point 52 to +30 volts, this change is coupled to the cathode of tube 11 through diode 45 since it is a rising voltage and the conductive states of the tubes change as in the case of the first pulse. Further operation of the circuit is a repetition of that described above.

The additional apparatus shown in the embodiment of Fig. 4 as compared to Fig. 2 is provided to restrict actuation of the trigger circuit to alternate rising edges of the input signal. By the teachings of Fig. 4 the circuit may be arranged to respond to signal variations of other polarities and positions. It will be obvious that other apparatus than that shown in Fig. 4 may be employed to obtain response only to alternate rising edges as long as the apparatus will render declining edges ineffective and will alternately couple the rising edges with greater effect to the grid and cathode of tube 11 in accordance with the conductive status of the tubes 10 and 11. As an exemplary modification which provides a simplification of the circuit of Fig. 4, diode 50 may be omitted if resistor 49 is disconnected from B— and connected instead between point 52 and the cathode of tube 10. This is possible since the purpose of diodes 48 and 50 is to maintain point 52 at the more positive potential level of $E_{in}$ and $E_{out}$. Diodes are shown in Fig. 4 since they speed the action of the circuit, but one diode and a resistor will provide the same result.

Fig. 4 has illustrated how the flip-flop circuit of Fig. 2 may be modified to provide a scale of two counter without adding any vacuum tubes or other components likely to require replacement. It should be noted that a low impedance output is provided in the counter as well as the flip-flop.

Although certain specific embodiments of this invention have been herein disclosed and described, it is to be understood that they are merely illustrative of this invention and other modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A regenerative trigger circuit having two stable states of operation comprising, first and second vacuum tube means each having at least anode, cathode, and control grid electrodes, a cathode load for said first tube and an anode load for said second tube, the anode of said second tube being directly connected to the grid of said first tube, the cathode of said second tube being connected to a first intermediate point in said cathode load, the grid of said second tube being returned to a second intermediate point in said cathode load, said second intermediate point being at a lower potential level than said first intermediate point, and a low impedance output terminal at the cathode of said first tube.

2. A regenerative trigger circuit having two stable states of operation comprising, first and second vacuum tube means each having at least anode, cathode, and control grid electrodes, a cathode load for said first tube and an anode load for said second tube, said cathode load comprising a first resistor and a second much smaller resistor connected in series, the smaller resistor being at the cathode end thereof, the anode of said second tube being directly connected to the grid of said first tube, the cathode of said second tube being connected to the junction of the cathode load resistors of said first tube, the grid of said second tube being returned to an intermediate point in said first cathode load resistor, said anode load having greater impedance than said cathode load, a trigger signal input terminal at the grid of said second tube, and a low impedance output terminal at the cathode of said first tube.

3. A regenerative trigger circuit having two stable states of operation comprising, first and second vacuum tube means each having at least anode, cathode, and control grid electrodes, a cathode load for said first tube and an anode load for said second tube, the anode of said second tube being directly connected to the grid of said first tube, the cathode of said second tube being connected to an intermediate point in the cathode load of said first tube, said anode load having greater impedance than said cathode load, and unilateral conducting means for connecting the cathode of said first tube to a fixed potential level.

4. A regenerative trigger circuit having two stable states of operation comprising, first and second vacuum tube means each having at least anode, cathode, and control grid electrodes, a cathode load for said first tube and an anode load for said second tube, the anode of said second tube being directly connected to the grid of said first tube, the cathode of said second tube being connected to an intermediate point in the cathode load of said first tube, said anode load having greater impedance than said cathode load, and first and second unilateral conducting means for respectively connecting the grid and cathode of said first tube to fixed potential levels, said first unilateral conducting means being connected in opposite polarity with respect to said second unilateral conducting means.

5. A regenerative trigger circuit having two stable states of operation comprising, first and second vacuum tube means each having at least anode, cathode, and control grid electrodes, a cathode load for said first tube and an anode load for said second tube, the anode of said second tube being directly connected to the grid of said first tube, the cathode of said second tube being connected to an intermediate point in the cathode load of said first tube, said anode load having greater impedance than said cathode load, an input circuit for actuating said trigger circuit exclusively from a predetermined edge of an input trigger signal comprising, a trigger signal input terminal, first and second coupling circuits connected between said input terminal and the grid and cathode respectively of said second tube for coupling only said predetermined edge to said grid and cathode, and means in one of said coupling circuits for blocking alternate occurrences of said edge from the associated electrode of said second tube.

6. A regenerative trigger circuit having two stable states of operation comprising, first and second vacuum tube means each having at least anode, cathode, and control grid electrodes, a cathode load for said first tube and an anode load for said second tube, the anode of said second tube being directly connected to the grid of said first tube, the cathode of said second tube being connected to an intermediate point in the cathode load of said first tube, said anode load having greater impedance than said cathode load, an input circuit for actuating said trigger circuit exclusively from a predetermined edge of an input trigger signal comprising, a trigger signal input terminal, first and second coupling circuits connected between said input terminal and the grid and cathode respectively of said second tube for coupling only said predetermined edge to said grid and cathode, and coupling means in said coupling circuits for rendering said predetermined edge effective on only one of the electrodes of said second tube in accordance with the conductive condition of said second tube.

7. A regenerative trigger circuit having two stable states of operation comprising, first and second vacuum tube means each having at least anode, cathode, and control grid electrodes, a cathode load for said first tube and an anode load for said second tube, the anode of said second tube being directly connected to the grid of said first tube, the cathode of said second tube being connected to an intermediate point in the cathode load of said first tube, said anode load having greater impedance than said cathode load, an input circuit for actuating said trigger circuit exclusively from a predetermined edge of an input trigger signal comprising, a trigger signal input terminal, first and second coupling circuits connected between said input terminal and the grid and cathode respectively of said second tube for coupling only said predetermined edge to said grid and cathode, and means in said second coupling circuit for biasing the input terminal end of said second coupling circuit at the highest potential appearing at the cathode of said first tube and the signal input terminal.

8. A regenerative trigger circuit having two stable states of operation comprising, first and second vacuum tube means each having at least anode, cathode, and control grid electrodes, a cathode load for said first tube and an anode load for said second tube, the anode of said second tube being directly connected to the grid of said first tube, the cathode of said second tube being connected to an intermediate point in the cathode load of said first tube, the grid of said second tube being returned to a more negative potential than its cathode, a trigger signal input terminal connected to the grid of said second tube through a condenser, and a unilateral conducting means connected between the grid of said second tube and a fixed potential, whereby only a predetermined edge of input trigger signals may actuate said circuit.

9. A regenerative trigger circuit having two stable states of operation comprising, first and second vacuum tube means each having at least anode, cathode, and control grid electrodes, a cathode load for said first tube and an anode load for said second tube, the anode of said second tube being directly connected to the grid of said first tube, the cathode of said second tube being connected to an intermediate point in the cathode load of said first tube, said anode load having greater impedance than said cathode load, an input circuit for actuating said trigger circuit exclusively from a predetermined edge of an input trigger signal comprising, a trigger signal input terminal, first and second coupling circuits connected between said input terminal and the grid and cathode respectively of said second tube, clamping means connected to the grid of said second tube for holding said grid non-responsive to signals other than said predetermined edge, a pair of unilateral conducting means serially connected in said second coupling circuit, the conductive direction of said last named means being selected to pass said predetermined edge, and means for biasing a point between said pair of unilateral conducting means at the cathode potential of said first tube during at least one of said stable states.

10. A scale of two counter circuit having a low impedance output variable between fixed potential levels comprising, first and second vacuum tube means each having at least anode, cathode, and control grid electrodes, a cathode load for said first tube and an anode load for said second tube, said anode load having greater impedance than said cathode load, the anode of said second tube being directly connected to the grid of said first tube, the cathode of said second tube being connected to a first intermediate point in said cathode load, the grid of said second tube being returned to a second intermediate point in said cathode load, said second intermediate point being at a lower potential level than said first intermediate point, an output terminal connected to the cathode of said first tube, a pair of clamping means for respectively clamping said grid and cathode of said first tube at the upper and lower of said fixed potential levels as maximum and minimum levels respectively, a trigger signal input terminal, first and second coupling circuits connected between said input terminal and the grid and cathode respectively of said second tube, a third clamping means connected to the grid of said second tube for establishing a minimum potential therefor, a pair of unilateral conducting means serially connected in said second coupling circuit for passing only rising edges of trigger signals from said input terminal, a fourth clamping means connecting a point between said pair of unilateral conducting means to said output terminal for establishing a minimum potential level therefor.

References Cited in the file of this patent

UNITED STATES PATENTS

| | | |
|---|---|---|
| 2,330,638 | Stratton | Sept. 28, 1943 |
| 2,426,256 | Zenor | Aug. 26, 1947 |

OTHER REFERENCES

Fig. 9.27 and paragraph 9.16, pages 348–349 of Radiation Lab. Series, vol. 19, "Waveforms," 1949.